United States Patent
Schoen

Patent Number: 5,263,392
Date of Patent: Nov. 23, 1993

[54] SUPPORT FOR HAND OPERATED ROTATABLE TOOL

[76] Inventor: Andre Schoen, 71 Gladstone Road, Rivervale, 6103, Western Australia, Australia

[21] Appl. No.: 784,910

[22] Filed: Oct. 30, 1991

[30] Foreign Application Priority Data

Oct. 31, 1990 [AU] Australia ............................... PK3101

[51] Int. Cl.⁵ .............................................. B25B 23/00
[52] U.S. Cl. ........................................ 81/462; 81/180.1
[58] Field of Search ............... 81/462, 180.1; 248/456, 248/352, 460, 461, 464

[56] References Cited

U.S. PATENT DOCUMENTS

| | | | |
|---|---|---|---|
| 2,361,690 | 10/1944 | Hunz | 248/352 X |
| 2,960,895 | 11/1960 | Richards | 81/462 |
| 4,625,600 | 12/1986 | Koren et al. | 81/462 |
| 4,829,856 | 5/1989 | Reynolds | 81/462 |
| 4,972,742 | 11/1990 | Brown | 81/462 |

FOREIGN PATENT DOCUMENTS

2517934  11/1976  Fed. Rep. of Germany ........ 81/462

*Primary Examiner*—D. S. Meislin
*Attorney, Agent, or Firm*—Larson and Taylor

[57] ABSTRACT

A support (10) for a hand operated rotatable tool, such as a wheel brace (12), having a socket (74) for location upon a nut/stud (14) for supporting an elbow (72) of the tool during use to inhibit slippage of the socket (74) off the nut/stud (14). The support (10) solves the problem of loosening nuts/studs (14) tightened with pneumatic wrenches—which loosening is often difficult and sometimes impossible with the relatively small wheel braces (12) provided in vehicle tool kits. The support (10) has a cradle (26) whose height above the ground can be adjusted so as to support the wheel brace (12) whilst maintaining an axis of the socket (74) in alignment with an axis of the nut/stud (14). The cradle (26) is mounted upon a frame (19) having a base (20), a first leg (22) and a second leg (24). The first leg (22) is pivoted between the base (20) and the second leg (24) so that the support (10) can be collapsed to a storage condition and erected to an in-use condition with the cradle (26) disposed upper-most. A tongue (58) of a free end (56) of the second leg (24) engages with one of a plurality of slots (40) in an outer base member (30) of the base (20) for effecting adjustment of the height of the cradle (26) above the base (20).

Other forms of height adjustment and a method of loosening/tightening a nut/stud are also described.

11 Claims, 7 Drawing Sheets

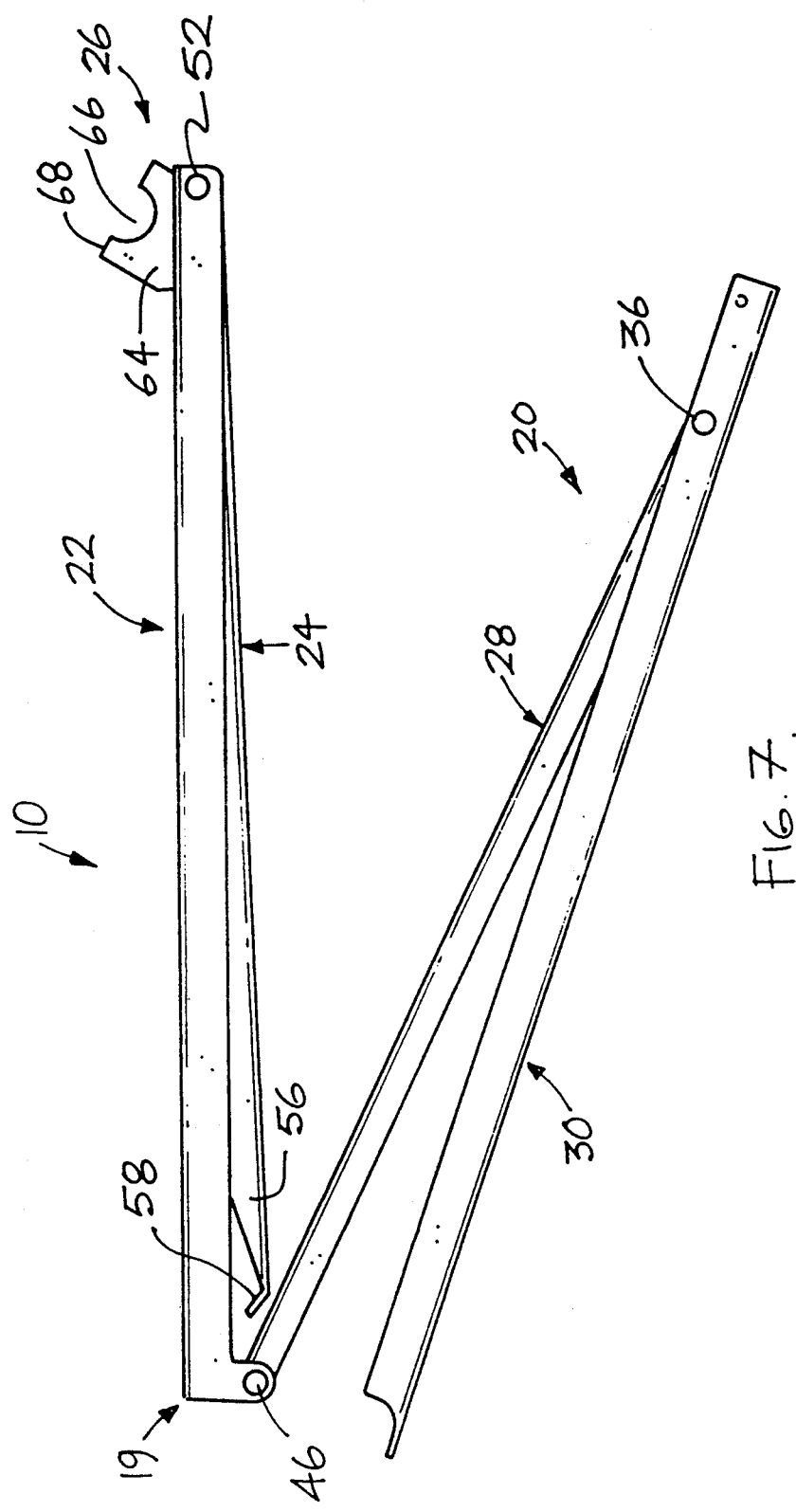

SUPPORT FOR HAND OPERATED ROTATABLE TOOL

The present invention relates to a support particularly, although not exclusively, envisaged for use with a hand operated rotatable tool, such as, for example, a wheel brace used in loosening and tightening wheel nuts/studs for vehicle wheels.

The support of the present invention could be used in relation to nuts and/or studs associated with machinery and the like, other than vehicle wheels.

At present it is common for tire fitters to use pneumatic wrenches when fitting tires to vehicles. The pneumatic wrenches tend to tighten nuts/studs used for fixing wheel hubs to vehicles at a torque somewhat greater than would normally be applied if a wheel brace were used. Also, it is common for present day vehicles to have relatively small compact wheel braces which are easily stored away in boots or engine compartments. Due to the relatively short length of such wheel braces, removal of wheel nuts/studs set in place with pneumatic wrenches can be very difficult and in some cases impossible.

Commonly such wheel braces have a socket dimensioned to fit about the wheel nut/stud, an elbow located within about 20 mm from a closed end of the socket, and an arm extending approximately 200 mm from the elbow. There is typically an angle of approximately 120° between the arm and an axis of the socket. To use such prior art wheel braces it is essential for the user to support the elbow of the wheel brace with one hand, whilst attempting to rotate the socket by pressing up or down on the shaft with the other hand. Consequently, the torque that can be applied in attempting to loosen the wheel nut/stud is limited to the torque which can be produced by the application of the force of one hand to the arm. Should the user attempt to apply the force of both of his or her hands to the arm the socket tends to slip off the wheel nut/stud because the force applied to the arm creates a second torque which is in the plan of the axis of the socket. It is this second moment which is resisted by the placement of the user's hand at the elbow.

Therefore, it is desirable to provide a mechanism whereby a user can apply the force of both of his or her hands or of his or her foot or feet to the arm of the wheel brace for applying greater torque for removal of the wheel nut/studs.

Therefore, it is an object of the present invention to provide a support for a hand operated rotatable tool having a socket locatable upon a nut/stud whereby the support maintains alignment of the socket with an axis of the nut/stud during use of the hand operated rotatable tool.

In accordance with one aspect of the present invention there is provided a support for a hand operated rotatable tool having a socket for location upon a nut/stud, the support comprising:

a cradle for rotatably supporting the rotatable tool;
a frame carrying the cradle; and,
height adjustment means for adjusting the height of the cradle above the ground;

whereby, in use, the height of the cradle above the ground can be adjusted with the height adjustment means so that an axis of the socket can be maintained aligned with an axis of the nut/stud during rotation of the tool.

Preferably, the frame has a relatively long base disposable substantially perpendicular to the axis of the nut/stud for inhibiting toppling of the support during use.

Preferably, the frame also has a first leg and a second leg, the first leg being pivotable about the base and the second leg being pivotable on the first leg and securable to the base so that the base and the first and second legs can be pivoted to lie contiguous each other in a stored condition and can be pivoted to form a triangle in an in-use condition.

Preferably, the base has an inner base member and an outer base member pivotably connected together, the inner base member being pivotably attached to the first leg and the outer base member having coupling means for coupling with a free end of the second leg so that adjustment of the location of coupling between the second leg and the outer base member adjusts the height of an apex formed between the first and second legs.

Preferably, the cradle is located proximate the apex so that its height above the base can be adjusted.

In accordance with another aspect of the present invention there is provided a method of loosening and tightening a nut/stud using a support for a hand operated rotatable tool having a socket for location upon the nut/stud, the method comprising the steps of:

adjusting the height above the ground of a cradle of the support so that the cradle is located proximate an axis of the nut/studs;

resting the tool upon the cradle so that an axis of the socket aligns with the axis of the nut/stud;

locating the socket over the nut/stud; and, rotating the tool to loosen or tighten the nut/stud;

whereby, the cradle maintains alignment of the axis of the socket with the axis of the nut/stud during rotation of the tool.

The present invention will hereinafter be described with particular reference to use with nuts although it is to be understood that it is of applicability to studs also. Also, the support of the present invention will hereinafter be described with particular reference to hand operated rotatable tools being wheel braces used in loosening and tightening wheel nuts of vehicle wheel assemblies.

One embodiment, being an example only, of the present invention will now be described with particular reference to the accompanying drawings in which.

Figure 1:
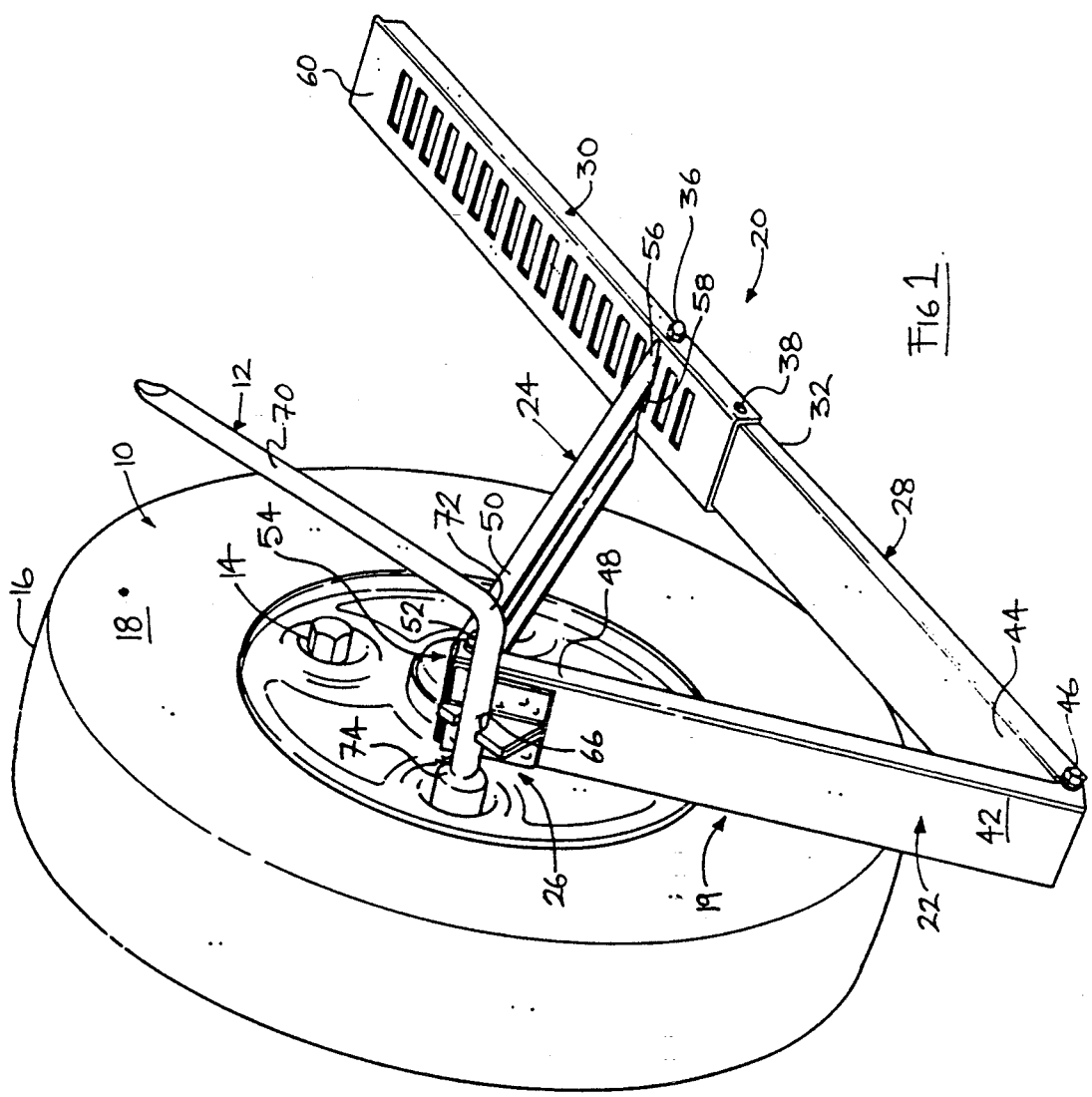
FIG. 1 is a side view of the support shown in an in-use condition for supporting a wheel brace in loosening a wheel nut of a vehicle wheel assembly.

In FIG. 1 there is shown a support 10 for a wheel brace 12 for loosening and tightening wheel nuts 14 of a vehicle wheel assembly 16 having a tire 18. The support 10 has a frame 19 comprising a base 20, a first leg 22, a second leg 24 and a cradle 26.

Figure 2:
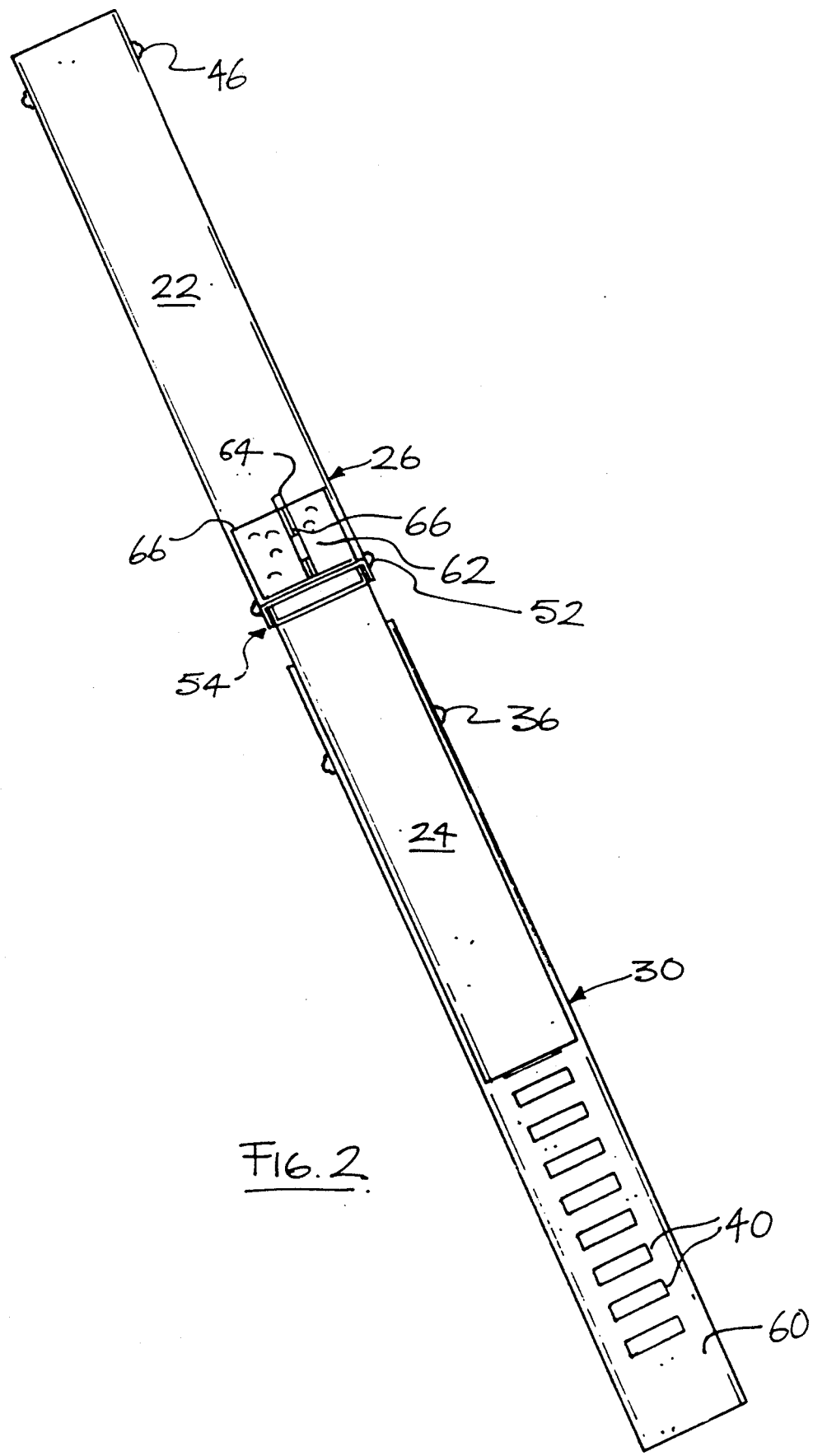
FIG. 2 is plan view of the support of FIG. 1.
Figure 3:
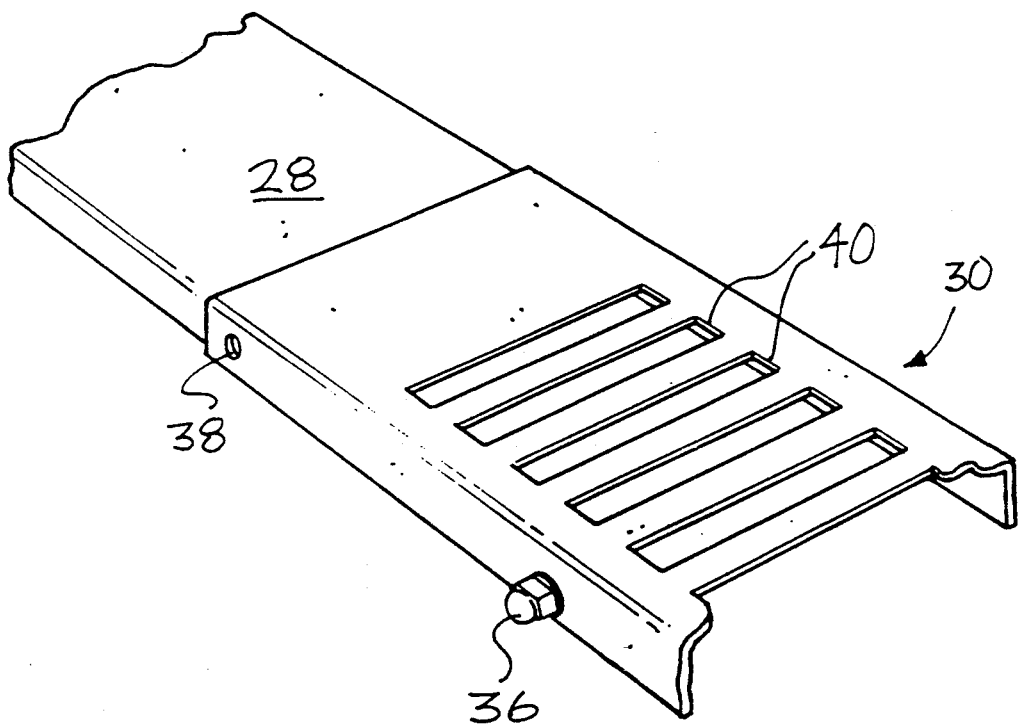
FIG. 3 is a perspective view, seen from above, of a pivotable attachment between an inner base member and an outer base member of a base of the support of FIG. 1.
Figure 4:
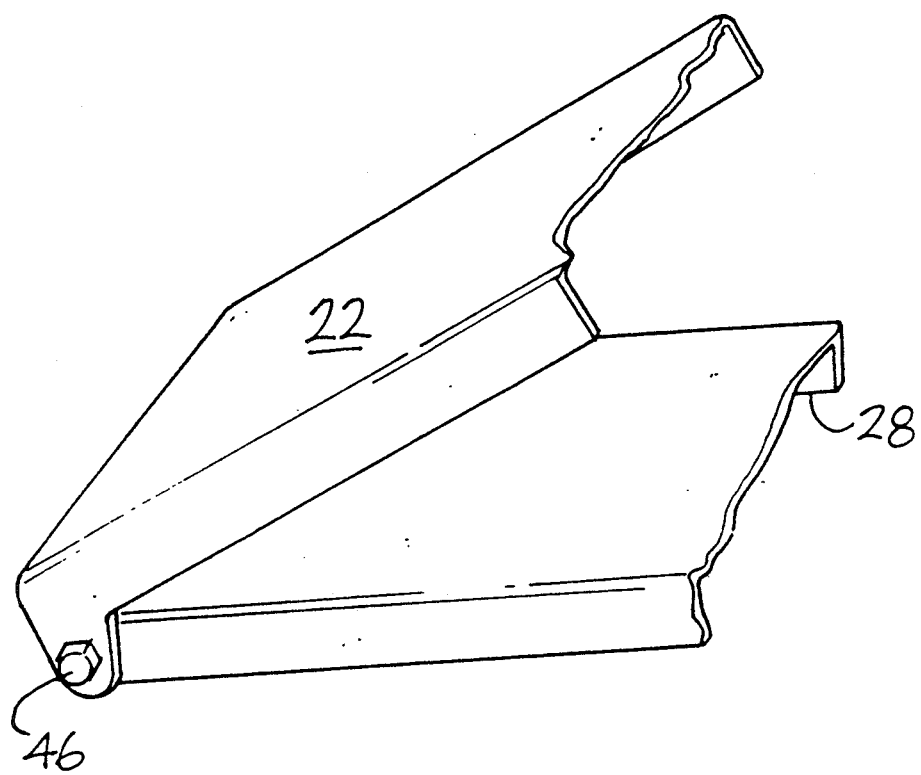
FIG. 4 is a perspective view seen from above of a pivotable coupling between the inner base member and a first leg of the support of FIG. 1.
Figure 6:
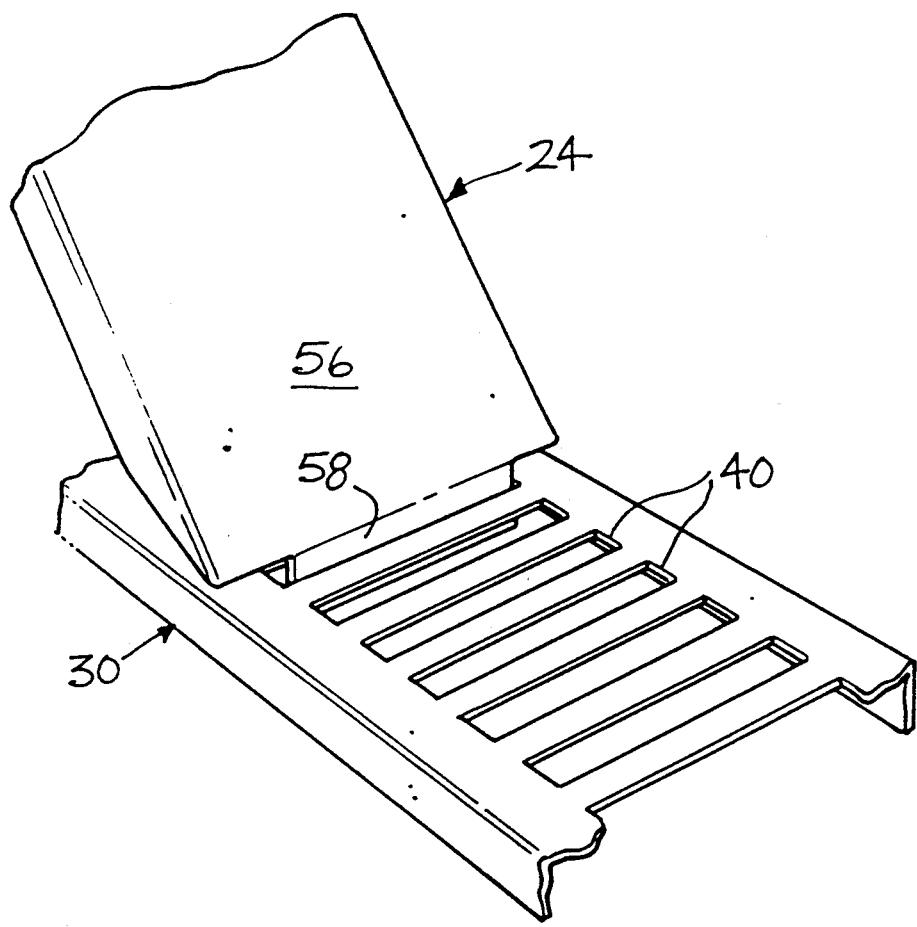
FIG. 6 is a perspective view seen from above of an adjustable coupling between the second leg and the outer base member of the support of FIG. 1; and, FIG. 7 is a side view of the support of FIG. 1 showing a process of folding to a stored condition.

The base 20 is formed of an inner base member 28 and an outer base member 30. Ends 32 and 34 of the inner and outer base members 28 and 30, respectively, are pivotably connected together by a pivot 36 typically in the form of a rod locatable through holes in longitudinal sides of the inner and outer base members 28 and 30. The inner and outer base members 28 and 30 are each formed of "U" section channel so that the outer base member 30 can be pivoted with respect to the inner base member 28 for storing the inner base member 28 within the outer base member 30 as indicated in FIG. 7. Further holes 38 are provided in the outer base member 30 closer to the end 34 than the holes receiving the pivot 36 shown in FIG. 1 so that the overall length of the base 20 can be increased by matching of the holes 38 with the holes in the end 32 of the inner base member 28 with the pivot 36. Typically, pivoting through the holes 38 is used when the tire 18 is flat and the wheel nuts 14 are accordingly closer to the ground. As shown in FIGS. 2, 3 and 6 the outer base member 30 has a plurality of slots 40 located side by side and spaced apart along the length of the outer base member 30. Typically, the slots 40 are rectangular in shape.

Also, as shown in FIG. 1 the first leg 22 has an end 42 connected to an end 44 of the inner base member 28 by a pivot 46. The first leg 22 is formed from a U shaped channel. In the exemplary embodiment the width of the U shaped channel of the first leg 22 is greater than the width of the U shaped channel of the inner base member 28 so that the end 44 can pivot within the end 42. The first leg 22 has another end 48 remote from the first mentioned end 42. The end 48 is coupled to an end 50 of the second leg 24 by another pivot 52. The coupling between the first leg 22 and the second leg 24 forms an apex 54 which is intended to be disposed uppermost when in use.

The second leg 24 is also typically formed of a U shaped channel of similar width to the U shaped channel of the inner base member 28 so that the end 50 may pivot within the end 48. A free end 56 of the second leg 24 has a tongue 58 dimensioned to be received in one of the slots 40 as shown in FIGS. 2 and 6. The height of the apex 54 above the base 20 can be altered by insertion of the tongue 58 into another one of the slots 40 spaced from the slot 40 in which it is presently located. For example, movement of the tongue 58 towards a free end 60 of the outer base member 30 reduces the height of the apex 54 above the base 20 and movement of the tongue 58 into a one of the slots 40 proximate the end 38 of the outer base member 30 increases the height of the apex 54 above the base 20.

Figure 5:
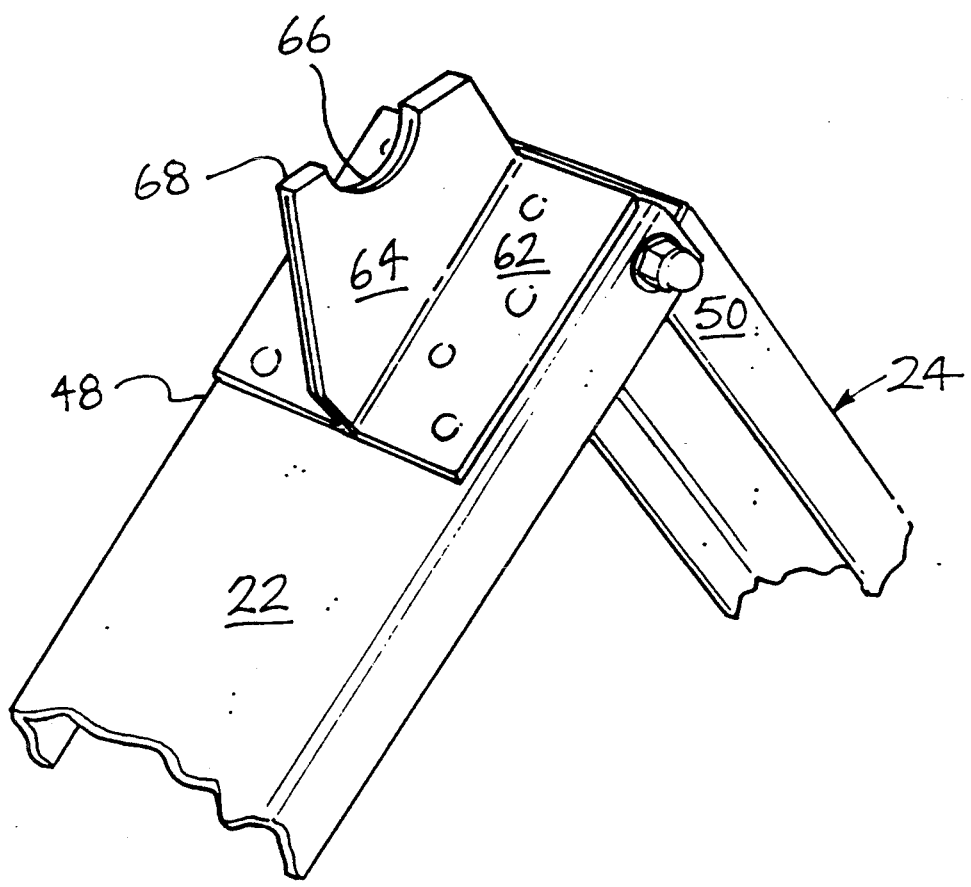
FIG. 5 is a perspective view seen from above of a pivotable coupling between the first leg and a second leg of the support of FIG. 1.

As shown in FIG. 1 the frame 19 carries the cradle 26 proximate the apex 54. In the exemplary embodiment the cradle 26 is attached to the first leg 22 at the end 48. Particularly as shown in FIG. 5 the cradle 26 has a base plate 62 conveniently spot welded to the end 48 and a web 64 disposed upwardly from the base plate 62. The web has a semi-circular cut-out 66 formed in an upwardly oriented edge 68 of the web 64. The cut-out 66 has a radius dimensioned to receive a shaft 70 of the wheel brace 12 for rotation therein.

It is envisaged that the cradle 26 could include two webs 64 spaced apart on the base plate 62. However, the use of one web 64 is preferable since it allows for use of the support 10 with wheel braces 12 having shorter distances between their elbows 72 and their sockets 74.

In use, the support 10 can be erected to the in-use condition shown in FIG. 1 from the stored condition indicated in FIG. 7 by pivoting the outer base member 30 in an anti-clockwise direction about the pivot 36 so that the ends 34 of the outer base member 30 overlie the end 32 of the inner base member 28. The inner base member 28 and the outer base member 30 are then aligned as shown in FIG. 1. The first and second legs 22 and 24 are then further pivoted in an anti-clockwise direction away from the base 20 about the pivot 46 so that the tongue 58 clears the inner base member 28. Then the second leg 24 is pivoted in an anti-clockwise direction about the pivot 52 until the free end 56 meets with the outer base member 30. The tongue 58 is then inserted into one of the slots 40 so as to dispose the cradle 26 at a height above the base 20 such that an axis of the socket 74 aligns with an axis of the wheel nut 14 when the wheel brace 12 is placed in the cut-out 66 of the cradle 26.

The support 10 is now in the in-use position and can be located so that the cut-out 66 of the cradle 26 is located proximate one of the wheel nuts 14 to be loosened. The socket 74 is then placed over the wheel nut 14 and the shaft 70 of the wheel brace 12 placed in the cut-out 66 of the cradle 26 as shown in FIG. 1. Force can then be applied to a free end of the wheel brace 12 for rotating the wheel brace 12 in either a clockwise or anti-clockwise direction. Such force produces a torque acting about the axis of the wheel nut 14 which tends to loosen or tighten the wheel nut 14 and a second torque acting in the plane of the axis of the wheel nut 14. The second torque tends to cause the socket 74 to slip off the wheel nut 14 in the absence of the support 10. However, the support 10 via the cradle 26 resists the second torque and maintains the axis of the socket 74 aligned with the axis of the wheel nut 14. Consequently, a person operating the wheel brace 12 may use either or both of his or her hands or either or both of his or her feet.

The height of the cradle 26 above the base 20 can then be adjusted by engagement of the tongue 50 into another one of the slots 40 so that the cut-out 66 can be located proximate another one of the wheel nuts 14 to be loosened.

Where the tire 18 of the vehicle wheel assembly 16 is flat the pivot 36 may be located through the holes 38 in the end 34 of the outer base member 30 so as to dispose the slots 40 further away from the pivot 46 of the inner base member 28. Accordingly, the cradle 26 can be disposed at a lower height above the base 20.

The support 10 can be returned to the stored condition by uncoupling the tongue 58 from the outer base member 30 and rotating the outer base member 30 in a clockwise direction so that its U shaped channel receives the inner base member 28. The second leg 24 is then pivoted in a clockwise direction so that it is located within the U shaped channel of the first leg 22, and the first and second legs 22 and 24 are simultaneously pivoted in a clockwise direction until the second leg 24 lies contiguously in the inner base member 28.

By use of the support 10 of the present invention greater torque can be provided via conventional wheel braces 12, as supplied with motor vehicles, to wheel nuts 14 so as to overcome the large locking torques typically applied by pneumatic wrenches. The cradle 26 inhibits the tendency for the socket 74 of the wheel brace 12 to slip off the wheel nut 14. The coupling of the second leg 24 to the base 20 by the location of the tongue 28 into one of the slots 40 enables raising and lowering of the cradle 26 so as to be locatable proximate each of the wheel nuts 14 of the wheel assembly 16 for allowing loosening and tightening thereof. The use of U shaped channels for the outer base member 30 and the first leg 22 allow for convenient folding of the support 10 to a stored condition which has a length equivalent to the length of the first leg 22 and a thickness equivalent to the thickness of the first leg 22 plus the outer base member 30. By the engagement of the tongue 58 in the slots 40 the height of the cradle 26 can be adjusted quite rapidly. The relatively large length of the base 20 is preferred so as to provide greater stability to the support for resisting the second torque of the wheel brace 12 that tends to cause the socket 74 to slip off the wheel nuts 14.

Modifications and variations such as would be apparent to a skilled addressee are deemed within the scope of the present invention. For example, various sizes of the support 10 could be made for use with motor cars, trucks, tractors, buses and the like. Also, adjustment of the height of the cradle 26 above the base 20 could be effected by movement of the cradle 26 along the first leg 22. In such a case the coupling between the second leg 24 and the outer base member 30 need not be adjustable. Further, the adjustment of the position of coupling of the second leg 24 to the outer base member 30, or the cradle 26 along the first leg 22, could be effected by a rack and pinion mechanism Still further, a rotatable load bearing surface could be provided on the cradle 26 so as to reduce the friction between the wheel brace 12 and the cut-out 66.

What is claimed is:

1. A support for a hand operated rotatable tool having a socket for location upon a stud/nut, the support comprising:
    a cradle for rotatably supporting the rotatable tool;
    a frame carrying the cradle, the frame having a first leg, a second leg and a base, the base being long relative to the first leg and the second leg and disposable substantially perpendicular to the axis of the nut/stud for inhibiting toppling of the support during use, said first leg being pivotally connected to said base and said second leg being pivotally connected to said first leg, said second leg also securable to said base so that said base, said first leg and said second leg can be pivoted to lie contiguous each other in a stored condition and can be pivoted to form a triangle in an in-use condition, said base having an inner base member and an outer base member pivoted together, said inner base member being pivotally attached to said first leg remote from said connection between said first leg and said second leg; and
    a height adjustment means constituted by a coupling means located on said outer base member, and a free end of said second leg, said coupling means being capable of receiving said free end of said second leg so that adjustment of the location of coupling between said second leg and said outer base member can adjust the height of said cradle above said base;
    whereby, in use, the height of said cradle above the ground can be adjusted with said height adjustment means so that an axis of the socket can be maintained aligned with an axis of the nut/stud during rotation of the tool when the tool is supported upon said cradle.

2. A support according to claim 1, in which the coupling means comprises of a plurality of slots disposed side by side and transversely on said outer base member, and said free end of said second leg is designed to be received in one of said plurality of slots, whereby, in use, the location of said free end of said second leg in different ones of said plurality of slots varies the height of said cradle above said base.

3. A support according to claim 1, in which said pivotal coupling between said inner and outer base members is adjustable for increasing the length of said base for allowing further lowering of said cradle with respect to said base.

4. A support according to claim 1, in which said inner base member and said outer base member may also be pivoted to lie contiguous each other in the stored condition so that the support, when in the stored condition, is not substantially longer than said first leg and said second leg when considered individually.

5. A support according to claim 4, in which said cradle is located upon said first leg of the frame proximate said pivotal coupling of said first leg to said second leg, said cradle being oriented upwardly for rotatably supporting the rotatable tool.

6. A support according to claim 5, in which said cradle has a web disposed upwardly from said first leg, and said web having a semi-circular cut-out formed in an upwardly oriented edge of said web for rotatably supporting the rotatable tool.

7. A support for a hand operated rotatable tool having a socket for location upon a nut/stud, the support comprising:
    a base disposable upon the ground and substantially perpendicular to an axis of the nut/stud, said base having a coupling means, a first free end and a second end, said coupling means being located intermediate said first free end and said second end;
    a first leg having a first end and a second end, said first end being pivotally attached to the second end of the said base;
    a second leg having a first end and a second free end, said first end being pivotally attached to the second end of said first leg and said second free end being releasably securable to said base by said coupling means for positioning said first leg and said second leg in a triangular configuration above said base, said triangular configuration having an upper apex at the attachment of said first leg and said second leg, the length of said base being substantially greater than the length of each of said first leg and said second leg, and said coupling means allowing releasable securement of said second free end of said second leg at a plurality of locations along said base, said plurality of locations corresponding to a plurality of heights of said apex above said base;
    a cradle located proximate said apex on said first leg, said cradle being oriented for rotatably supporting the rotatable tool, the height of said cradle above said base being adjustable by adjustment of the position of releasable securement of said second free end of said second leg to said base;
    said base having an inner base member and an outer base member pivoted together, said inner base member being pivotally attached to said first leg remote from the connection between said first leg and said second leg, said inner base member and said outer base member being pivotal to lie contiguous to each other in the stored condition so that the support, when in the stored condition, is not substantially longer than said first leg and said second leg when considered individually;

whereby, in use, the height of said cradle above the ground can be adjusted so that an axis of the socket can be maintained aligned with an axis of the nut/stud during rotation of the tool when the tool is supported upon said cradle.

8. A support according to claim 7, in which the coupling means comprises of a plurality of slots disposed side by side and transversely on said outer base member, and said second free end of said second leg can be received in individual ones of said plurality of slots; whereby, in use, the location of the free end of the second leg in individual ones of said plurality of slots can vary the height of said cradle above said base.

9. A support according to claim 7, in which said pivotal coupling between said inner and outer base members is adjustable for increasing the length of said base for allowing further lowering of said cradle with respect to said base.

10. A support according to claim 7, in which said cradle is located upon said first leg proximate the attachment of said first leg to said second leg, said cradle being oriented upwardly for rotatably supporting the rotatable tool.

11. A support according to claim 10, in which said cradle has a web disposed upwardly from said first leg, said web having a semi-circular cut-out formed in an upwardly oriented edge of said web for rotatably supporting the rotatable tool.

* * * * *